United States Patent [19]

Kubat et al.

[11] 4,349,504
[45] Sep. 14, 1982

[54] INJECTION MOULDING PROCESS USING POLYMER BLENDS CONTAINING HIGH MOLECULAR POLYETHYLENE OF HIGH DENSITY

[76] Inventors: Josef Kubát, Solparksvägen 3, S-171 35 Solna; Hans M. Rigdahl, Klostergången 7, S-413 18 Gothenburg; Jan K. Djurner, Viktoriagatan 8, S-411 25 Gothenburg, all of Sweden

[21] Appl. No.: 199,515
[22] PCT Filed: Oct. 19, 1979
[86] PCT No.: PCT/SE79/00210
    § 371 Date: Jun. 20, 1980
    § 102(e) Date: Jun. 12, 1980
[87] PCT Pub. No.: WO80/00813
    PCT Pub. Date: May 1, 1980

[30] Foreign Application Priority Data

Oct. 20, 1978 [SE] Sweden ................................ 7810977

[51] Int. Cl.³ ........................... B29F 1/00; B29B 1/00
[52] U.S. Cl. ........................... 264/328.17; 264/328.1
[58] Field of Search ..................... 264/328.1, 328.17

[56] References Cited

U.S. PATENT DOCUMENTS 4,237,089 12/1980 Kubat .............................. 264/328.1

OTHER PUBLICATIONS

Chemical Abstracts 85:64204, 86:91157.

Primary Examiner—Thomas P. Pavelko
Attorney, Agent, or Firm—Cushman, Darby & Cushman

[57] ABSTRACT

A process for producing injection moulded parts having markedly improved mechanical strength properties is described wherein a blend of high molecular polyethylene having high density with a matrix material which consists of a polymeric material with which the high molecular polyethylene has a limited compatibility is injection moulded at high injection moulding pressures exceeding 250 MPa, whereby a fibre reinforced injection moulded article having improved mechanical properties is produced.

8 Claims, 4 Drawing Figures

■ HMWHDPE
▲ 60% HDPE/40% HMWHDPE

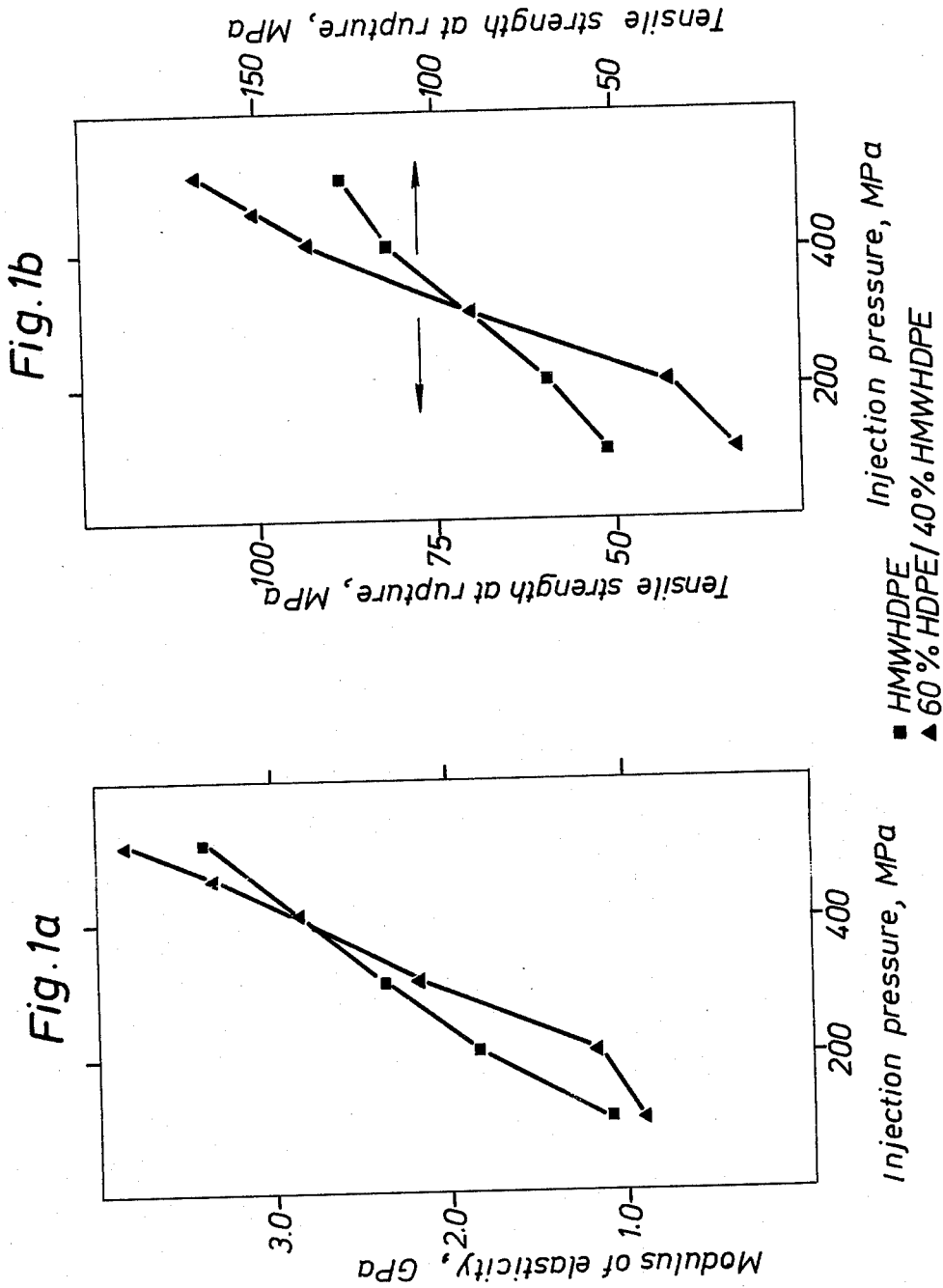

▲ = LDPE/HMWHPE
■ = HMWHDPE

INJECTION MOULDING PROCESS USING POLYMER BLENDS CONTAINING HIGH MOLECULAR POLYETHYLENE OF HIGH DENSITY

The present invention relates to a process for injection moulding at high pressures exceeding 250 MPa (300 MPa) of blends of high molecular polyethylene having high density (HMWHDPE) with a polymeric material with which HMWHDPE has a limited compatibility (solubility) for producing an injection moulded article, wherein HMWHDPE forms a fibre phase in a matrix of the other polymeric material.

From the Swedish Patent Specification No. 401,129 it is previously known that an essential increase of the pressure in the mould cavity in the processing of thermoplastic resins by means of injection moulding results in a number of property improvements of the moulded parts and at the same time certain technical process advantages can be obtained. Thus, said Swedish Patent Specification discloses an injection moulding process wherein the pressure in connection with the injection and subsequent solidification of the plastic melt exceeds 250 MPa. Said pressure range shall be compared with the pressure range 50–150 MPa which is the normal pressure range in injection moulding.

Among the improvements of the properties of the moulded part which are provided with process pressures exceeding 250 MPa there is to be noted a general increase of the level as regards the stiffness (modulus of elasticity) and strength parameters of the product as has been obtained in experiments with polyethylene of varying density and with polypropylene. Furthermore, in measurements on both crystalline as amorphous polymers a substantial decrease in the mould shrinkage has been observed. In certain cases said change was so large that the mould shrinkage assumed negative values.

An additional property improvement which has been observed in experiments of this type has been a substantial decrease of the internal stress level. As is well known internal stresses are a defect of normal injection mouldings; they i.a. can result in warpage, undesirable formation of crazing and cracking etc. Their reduction, in certain cases complete elimination, can be traced back to an increase of the melting and softening point, respectively of the plastic with the pressure. Thus, a pressure within the range 250–1000 MPa has been found to increase these critical temperatures so that a practically momentary solidification of the melted plastic material injected in the mould cavity is obtained. This prevents the formation of an internal stress structure, which, as is well known, is due to a gradually solidification of the melt and to the forces which the already solidified and the still liquid portions of the moulded part exert on each other.

As regards the improvement of the property profile of the moulded part, especially as regards the mechanical parameters, the effects obtained when increasing the process pressure are dependent on the structure of the plastic used. Thus, the greatest changes have been observed with crystalline plastics, especially polyethylene, wherein they have been traced back to changes in the structure of the crystalline phase. In the crystallization of a polyethylene melt under pressure exceeding about 300 MPa a crystal modification is obtained wherein the folded lamellar structure present at normal pressures is converted to a structure consisting of straight chains (extended chain-structure) to an extent increasing with the pressure. The improved property profile can be explained by the presence of said new structure. The new modification with straight chains i.a. gives a more organized package of the molecules in the space.

Especially remarkable results are obtained with HD-polyethylene having high molecular weight, which refers to polyethylene having a molecular weight of from 200.000 up to 1.5 millions and higher (corresponding to a melt index of less than 1 g/10 minutes at 190° C./2 kg load) hereinafter designated HMWHDPE. As compared to the improvements of modulus and strength obtained with this and similar qualities the corresponding values obtained with HDPE of normal molecular weight were relatively small. As an illustration of the extremely striking increase of the property level with an increase of the pressure reference is made to the values shown in the following table I.

TABLE I

|  | E GPa | $\sigma_\beta$ MPa |
|---|---|---|
| HMWHDPE | 3,4 | 130 |
| HDPE | 0,6 | 25 |
| Process conditions: | Injection pressure 500 MPa | |
|  | Mould temperature 30° C. | |

E = modulus of elasticity
$\sigma_\beta$ = tensile strength at rupture

According to the present invention it has been found that in the injection moulding at high injection moulding pressures (injection and holding pressures) exceeding 250 MPa of blends of HD-polyethylene having very high molecular weight (HMWHDPE), which refers to a molecular weight of 200.000 and up to 1.5 millions and more, with polymeric materials with which HMWHDPE has a limited compatibility (solubility) HMWHDPE forms a fibre phase in a matrix of the other polymeric material.

Thus, by using said blend of HMWHDPE and said other polymeric material in injection moulding with high pressures fibres of extended chain-type of HMWHDPE with extremely good mechanical properties are obtained which form a reinforcement in the matrix material. The generation of extended chain-fibres is facilitated by the large shear forces which prevail between the two different melts of material during the filling and packing stage during the injection cycle.

By means of this fibre reinforcement an injection moulded part with superior mechanical properties, such as tensile strength and modulus of elasticity, is obtained in one single step. Said properties are highly improved as compared to the corresponding properties for the matrix material and exceed when using injection moulding pressure exceeding 400 MPa using certain materials, such as HD-PE, as matrix material even the corresponding properties of pure HMWHDPE.

Suitable matrix materials together with which HMWHDPE can be injection moulded in the process according to the present invention are such polymeric materials with which HMWHDPE has a limited compatibility. These polymeric materials includes polyethylene of HD-, MD- and LD-types of normal molecular weight, which refers to such materials which normally are used in injection moulding or extrusion. Other suitable materials are e.g. other polyolefins, such as polypropylene and polystyrene, polyvinylchloride, polyacetal, polyamides, copolymers of these and others.

In the enclosed drawings

FIG. 1a shows the modulus of elasticity plotted against injection pressure for pure HMWHDPE and for blends of HMWHDPE with HDPE;

FIG. 1b shows the tensile strength at rupture plotted against the injection pressure for the same materials as FIG. 1a.

The invention is illustrated by means of the following specific examples which described embodiments of the invention but which are not intended to limit the invention in any respect.

EXAMPLE 1

A blend of 40% by weight of HMWHDPE and 60% by weight of HDPE of normal molecular weight was injection moulded with different pressures from 100 MPa and upwards. The conditions used during the experiments can be seen from the following disposition.

Material: high density polyethylene having a very high molecular weight (HMWHDPE), melt index 0.1 g/10 minutes (MFI 190/2), density 0.953 g/cm$^2$.

High density polyethylene having normal molecular weight (HDPE), melt index 7 g/10 minutes (MFI 190/2), density 0.960 g/cm$^3$.

INJECTION MOULDING CONDITIONS

Injection pressure: 100–500 MPa
Mould temperature: 30° C.
Cylinder temperature: 250°–280° C.

The results obtained in the experiments are shown in FIGS. 1a and 1b which show the modulus of elasticity, E, for blends of HMWHDPE and HDPE as compared to the corresponding property of pure HMWHDPE (1a) and the tensile strength at rupture, $\rho_B$, for the same materials (1b) respectively plotted against the pressure used. From the figure it can be seen that both said parameters rapidly increase with increasing injection pressure and attains very high values at a pressure level of 500 MPa. From FIG. 1a it can be seen that in spite of the fact that E is smaller for the composite material than for pure HMWHDPE at 200 MPa the situation is reversed at higher pressures. Thus, at the higher pressures the fibre generation described (of extended chains) of HMWHDPE in the matrix material took place and a fiber reinforced moulded part having excellent mechanical strength properties was obtained. The fibre character of the moulded parts and the composite material was confirmed by means of scanning electron measurements.

EXAMPLE 2

Exactly the same procedure as in example 1 was used except that 60% by weight of HDPE was replaced with 60% by weight of low density polyethylene (LDPE) having the following properties: melt index 7 g/10 minutes, density 0.917 g/cm$^3$.

The materials were blended in an extruder in the proportions 60% by weight of LDPE and 40% by weight of HMWHDPE. The injection moulding conditions were exactly the same as those used in example 1.

Figure 2:
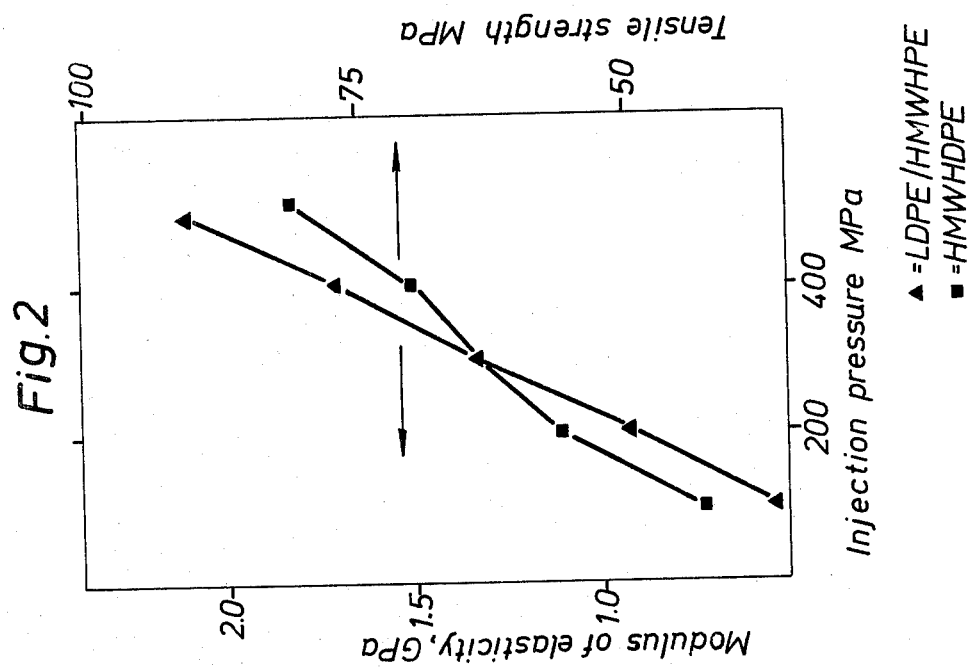
FIG. 2 shows the modulus of elasticity and the tensile strength plotted against the pressure for a blend of LDPE and HMWHDPE.

FIG. 2 shows the results obtained for the composite material. From the figure it can be seen that the modulus of elasticity, E, and tensile strength increase with increasing pressures. At high pressures (400–500 MPa) these parameters assume high values, especially bearing in mind that the major part of the composite materials consisted of soft LDPE.

Figure 3:
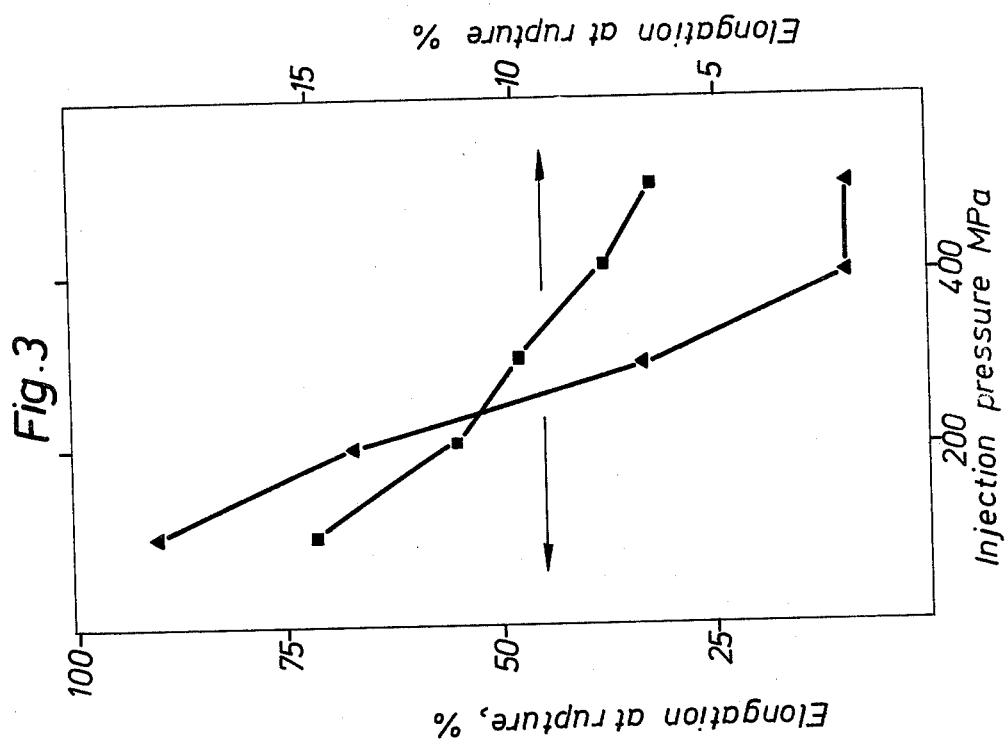
FIG. 3 shows the elongation at rupture for a blend of LDPE and HMWHDPE and for pure HMWHDPE plotted against the pressure.

FIG. 3 shows the elongation at rupture plotted against the injection pressure for the blend of 60% LDPE/40% HMWHDPE and for pure HMWHDPE. From the figure it can be seen that in spite of the substantial increase in stiffness and strength with increasing pressure for the composite material this material is rather ductile also at high pressures. From this points of view the material is superior to pure HMWHDPE injection moulded at e.g. 100 MPa which both has lower tensile strengths at rupture and elongation at rupture.

We claim:

1. A process for producing a fiber-reinforced injection molded article having improved mechanical strength, said process comprising injection molding a blend of:
   (a) high density high molecular weight polyethylene, blended with
   (b) a polymeric matrix material with which the polyethylene of (a) has a limited solubility such that the high molecular weight high density polyethylene forms a fiber phase in the matrix material,
   at a molding pressure of more than 250 MPa thereby producing a fiber-reinforced injection molded article having improved mechanical properties.

2. The process according to claim 1, wherein extended chain-fibers are formed throughout the injection molded article by the shear forces present between the blend of (a) and (b) during the high pressure injection molding.

3. The process according to claim 1, wherein said injection molding pressure is in the range of about 300 to 800 MPa.

4. The process according to claim 1, wherein said high density high molecular weight polyethylene has a molecular weight in the range of about 200,000 to about 1.5 million.

5. The process according to claim 1, 3 or 4, wherein the matrix material is high density polyethylene of normal molecular weight.

6. The process according to claim 1, 3, or 4, wherein the matrix material is low density polyethylene.

7. The process according to claim 6, wherein the blend is composed of about 40 weight percent of high density high molecular weight polyethylene and about 60 weight percent high density normal weight polyethylene.

8. The process according to claim 6, wherein the blend is composed of about 40 weight percent of high density high molecular weight polyethylene and about 60 weight percent low density polyethylene.

* * * * *